Jan. 13, 1942.  B. RONAY  2,269,484
AUTOMATIC ARC WELDING MACHINE
Filed Dec. 14, 1938  2 Sheets-Sheet 1

INVENTOR
BELA RONAY
BY
*Ransom K. Davis*
ATTORNEY

Jan. 13, 1942.  B. RONAY  2,269,484
AUTOMATIC ARC WELDING MACHINE
Filed Dec. 14, 1938  2 Sheets—Sheet 2

INVENTOR
BELA RONAY
BY
Ransom K. Davis
ATTORNEY

Patented Jan. 13, 1942

2,269,484

UNITED STATES PATENT OFFICE 2,269,484

AUTOMATIC ARC WELDING MACHINE

Bela Ronay, Annapolis, Md.

Application December 14, 1938, Serial No. 245,649

6 Claims. (Cl. 219—8)

(Granted under the act of March 3, 1883, as amended April 30, 1928; 370 O. G. 757)

This invention relates to an arc-welding machine having means for automatically regulating the rate of deposition of metal with respect to the melting rate of the electrode.

It is an object of this invention to provide a welding machine capable of maintaining the arc at a constant predetermined length regardless of variations in the melting rate of the electrode.

It is a further object of the invention to provide a welding machine which is capable of unrestricted operation in any of the welding positions.

The welding machines of the prior art achieve satisfactory performances only when the prime consideration is the weight of metal deposited in unit time, regardless of the quality of the resulting weld metal and the joint produced. None of these devices takes into consideration the extremely rapid changes of the current fluctuation and therefore this equipment is not suitable for test purposes nor for the production of high quality welds.

The fluctuation of the current values takes place at high frequency so that a fraction of a second is an important time element, and arc irregularities occurring at such intervals are of sufficient value to adversely influence the quality of the resultant weld. Since the apparatus now available consists of geared mechanism operating with considerable clearances, and because of the kinetic energy of the relatively large masses in rotation, quick response to the control element cannot be obtained.

To overcome the above shortcomings, the device described below was developed.

Referring now to the drawings.

Figure 1:
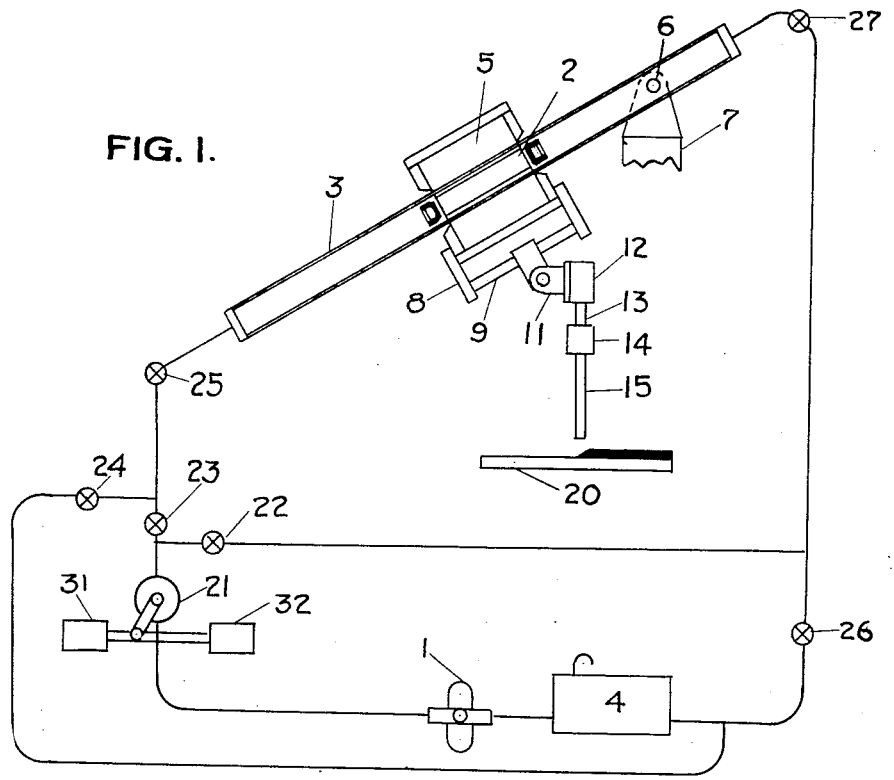
Fig. 1 is a diagrammatic view of the welding machine with its accompanying hydraulic circuit.

Referring to Fig. 1, the apparatus consists of a constant volume pump 1 delivering a fluid from a reservoir 4 against a movable piston 2 which is freely floating in a cylinder 3. The fluid system is closed to the extent that the space behind the piston is filled with the same fluid as that pumped into the cylinder from the reservoir. The fluid discharged from the cylinder as the piston progresses is conveyed into the reservoir which is under atmospheric pressure. The cylinder 3 in which said piston 2 travels is of non-magnetic material, while the piston is of magnetic material.

Mounted on the cylinder 3 is an iron-clad solenoid 5 which is energized from an independent source of current. When the solenoid is energized it becomes magnetically coupled with the piston and by virtue of the design of the solenoid there is no relative or lost motion between the two parts. Thus as the piston is traveling, actuated by the fluid pressure developed by the pump, the solenoid slides upon the cylinder at exactly the same velocity as the piston.

Figure 2:
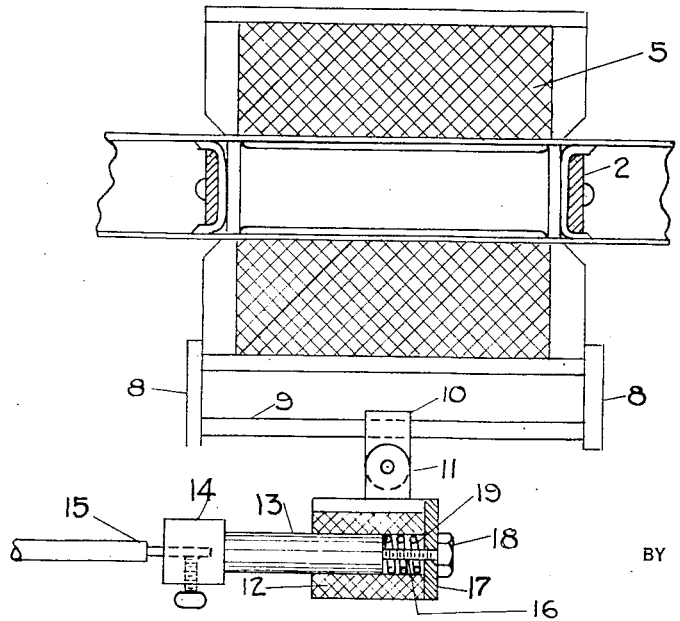
Fig. 2 is a view, in section, of a portion of the device including the main solenoid and the attachment for holding the welding electrode.

As shown in Fig. 1, the cylinder 3 is pivotally mounted at 6 upon an upright standard 7. The solenoid 5 has its outer framework provided with parallel lugs 8 between which is supported a bar 9. Clamped in any selected location on the bar is a member 10 to which is pivotally attached an ear 11 extending from the framework of a solenoid 12, as best shown in Fig. 2. Sliding within the solenoid 12 is a rod 13 carrying at its exposed end a head 14 in which is secured the upper end of the welding electrode 15. The other end of the rod 13 is reduced and threaded as shown at 16, and the end of this reduced portion extends through a central hole in the end plate 17 of the solenoid. A nut 18 is screwed upon the protruding portion of the reduced section 16, and serves to draw the rod 13 against a spring 19 located between it and the end plate 17.

As shown in Fig. 1, when the cylinder 3 is pivotable at an angle to the horizontal, it forms the hypotenuse of a right triangle. The vertical leg is the electrode and the base metal or ground 20 is the base line. As the solenoid descends with the fluid propelled piston the electrode is moving parallel to its original position.

If the oil delivery of the pump is proportional to the melting rate of the electrode, the latter may be consumed, i. e., deposited, without changing the velocity of the piston and the solenoid travel, respectively. However, the melting of an electrode is not constant for its entire length and there are other factors which prevent the deposition of an electrode at a constant rate of feed. If a constant rate of feed was maintained the arc would elongate excessively and extinguish altogether in case the melting rate of the electrode was faster than the rate of feed. If, on the other hand, the melting rate of the electrode is slower than the rate of feed, then the electrode would impinge upon the work and by short-circuiting the arc, would extinguish it.

To prevent the occurrence of either of the above phenomena and to control the tendency to elongate or reduce the arc length from the predetermined value, the following control system was evolved.

As shown in Fig. 1, there is a solenoid controlled valve 21 in the fluid system installed between pump and cylinder. By means of by-pass valves the flow of the liquid under pressure may be so directed that the above-mentioned solenoid controlled valve is between the discharge end of the pump and the piston, regardless of the direction of the flow in the cylinder proper. For example, when it is desired to apply pressure to the lower end of the piston, as shown, the valves 23, 25, and 26 are opened, the valves 24 and 22 are closed, and valve 27 is used as a throttling means. When this is done pressure is applied to the lower end of the cylinder and the upper end of the cylinder is connected to the reservoir. To apply pressure to the upper end of the cylinder it is only necessary to close valves 23 and 26, open valves 24 and 22, and use valve 25 as a throttling means to bleed out the fluid in the lower end of the cylinder.

Figure 4:
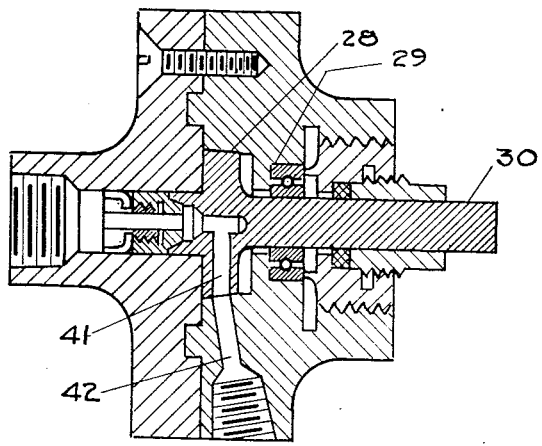
Fig. 4 is a longitudinal sectional view of the solenoid controlled valve of the hydraulic circuit.

The solenoid controlled valve 21, which is shown in detail in Fig. 4, is of a design capable of instant regulation and having but one moving part 28, which is pivotable on ball bearings 29. The entire small mass of the valve itself, being in an oil bath, insures practically frictionless performance. Since the entire movement of the valve is restricted to less than five degrees, the inertia of the valve is also negligible. The valve stem 30 is connected by means of a simple lever mechanism to two solenoids 31 and 32, one of which is always energized, so that the valve is always in the fully open or the partially closed position, depending upon which of the solenoids is active. The valve stem 30 extends from the valve disc 28 which is provided with a radial passage 41. Turning valve stem 30 varies the opening between the end of this passage and passage 42.

Figure 3:
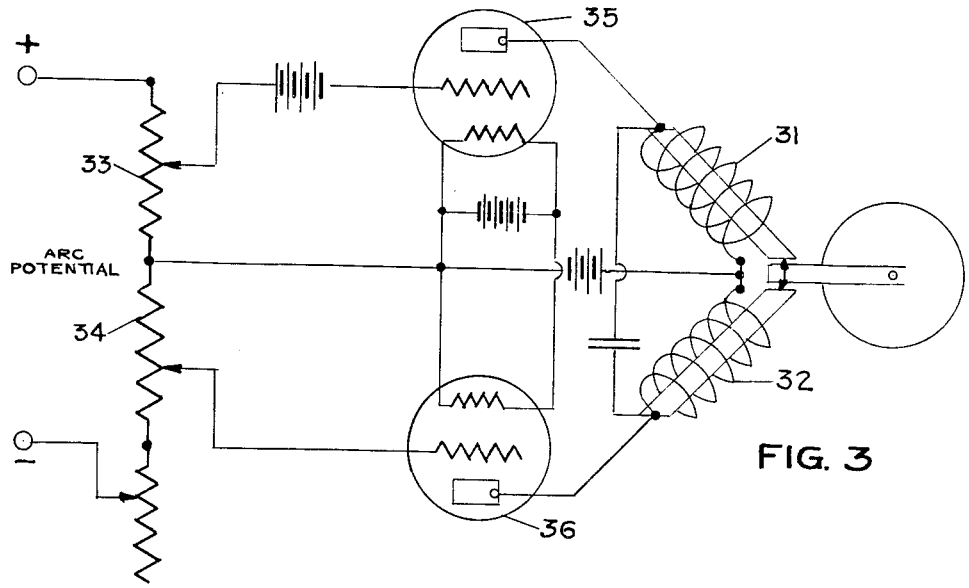
Fig. 3 is a schematic diagram of the electrical circuits of the device.

The solenoids in turn are actuated by two thyratron tubes 35 and 36, which function as inertia-free relays. The electric circuit shown in Fig. 3 discloses the manner of connection between the thyratron tubes and the welding circuit, together with the auxiliary circuits needed to make the tubes function. The circuit shown enables the use of the thyratrons as controllable relays.

By changing the values of variable resistors 33 and 34 it is possible to pass current through one of the tubes when the arc potential exceeds the predetermined value by one or one and one-half volts, and to have this tube cease to function and to pass current through the other tube when the arc voltage drops by one or one and one-half volts below the predetermined value. The plate current passed by either of the tubes is in series with one of the solenoids, so that the valve opens or partially shuts, depending upon which of the solenoids is energized. Thus the flow of the fluid between pump and piston is controlled by practically inertia-free elements, enabling the deposition of an electrode at a constant potential and at a variable rate of feed which is altered automatically by maintaining the constant potential of the arc.

The rate of feed may be varied over the full range required for the deposition of electrodes of various types and sizes by regulating the throttle valves 25 and 27, shown in Fig. 1. The rate of progression or the length of deposits obtainable from a single electrode is regulatable by changing the relative angle between the work and the solenoid 5. This change is accomplished merely by pivoting the cylinder to increase or decrease the length of the base line.

The apparatus is suitable for welding in any of the three required positions without changing the position of the cylinder, except by a few degrees. The electrode carrying device may be mounted under or over the magnetic frame of the solenoid 5, depending upon whether the electrode is to be deposited in the flat, vertical, or overhead position. The travel of the piston is reversible by changing the direction of flow in the fluid system, as described above. The solenoid 12 and the electrode carried thereby may be reversed with respect to the carrying frame of the solenoid 5 by reversing the pivotable connection between parts 10 and 11.

The solenoid 12 and its associated mechanism provides means for starting the arc and for re-starting the arc following interruption to the current flow through the electrode. When the electrode is fed toward the work and is short-circuited thereon, the solenoid 12 becomes energized and withdraws the core 13, thereby causing the main circuit to break sufficiently to start the arc. The spring 19 mounted in the solenoid is then compressed by the action of the solenoid and held so as long as there is current flowing in the welding arc. If the current thereafter ceases, the core is pushed out by the spring, automatically re-starting the arc. The solenoid 12 is connected to a shunt parallel with the welding circuit terminating in the electrode proper.

The method of controlled hydraulic feed is applicable not only to a stick-feed mechanism, as disclosed above, but also to control the continuous feed required when a continuous electrode is unwound from a reel.

While the disclosure has been restricted to a specific embodiment of the apparatus, the invention is not to be restricted thereby but only by the limitations and scope of the appended claims.

The invention described herein may be manufactured and/or used by or for the Government of the United States of America for governmental purposes without the payment of any royalties thereon or therefor.

I claim:

1. An arc-welding machine comprising an electrode, an electrode carrying means comprising a solenoid having the electrode adjustably attached thereto, a trackway for said solenoid comprising a hollow tube of non-magnetic material, a piston of magnetic material movable within said tube, means to move said piston, and means to energize said solenoid, said solenoid when energized following the movements of said piston along said tube.

2. An arc-welding machine as claimed in claim 1, characterized in that said piston moving means comprises a fluid circuit having means for applying a fluid pressure against either end of said piston at will and means to regulate said pressure in accordance with the value of the arc potential of the welding arc.

3. An arc-welding machine as claimed in claim 1, characterized in that said piston moving means comprises a fluid circuit having means for applying a fluid pressure to either end of said piston at will, means for varying the rate of admission of fluid to the end of the piston under pressure, said means comprising a substantially inertia-free throttling valve, and means responsive to variations in the magnitude of the arc potential of the welding arc for varying the opening of said throttling valve, by an infinite number of steps within a desired range of openings.

4. In an arc-welding machine as claimed in claim 1, a fluid circuit having means for applying a fluid pressure to either end of said piston at will, means for varying the rate of admission of fluid to the end of the piston under pressure, said means comprising a throttling valve, a pair of oppositely acting solenoids connected for operating said valve, an electrical circuit comprising two electronic tubes, each of said tubes being connected to derive its grid voltage from the welding circuit and in such manner that an increase in arc potential above a predetermined value will cause current to be passed by one of said tubes and variations in said arc potential above said predetermined value will proportionately vary the amount of said current passed, while a decrease from said predetermined value will cause current to be passed by the other in the same manner, the plate current of each of said pair of tubes being led through one of said pair of solenoids.

5. An arc-welding machine as claimed in claim 1, characterized in that said piston moving means comprises a fluid circuit having means for applying a fluid pressure to either end of said piston at will, means for infinitely varying within desired limits the rate of admission of fluid to the end of the piston under pressure, said means comprising a throttling valve, a pair of oppositely acting solenoids connected for operating said valve, an electronic tube relay connected between each of the solenoids of said pair and the welding circuit in such a manner as to selectively and variably energize said solenoids upon variation of the arc potential of the welding arc above or below a predetermined value.

6. In an arc-welding machine, a hollow tube, a solenoid mounted around said tube for sliding movement therealong, an electrode carried by said solenoid, a piston in said tube, means for applying fluid pressure to either end of said piston at will, and means independent of the welding circuit for energizing said solenoid whereby said solenoid will be magnetically coupled to said piston and will follow the movements of said piston along said tube.

BELA RONAY.